United States Patent [19]

Akiyama et al.

[11] 4,315,966
[45] Feb. 16, 1982

[54] FIBROUS SUBSTRATE VULCANIZATION-ADHERED TO ETHYLENE-PROPYLENE RUBBER COMPOSITION

[75] Inventors: Takeshi Akiyama; Toshiyuki Koide; Mutsuo Nagasawa, all of Yokkaichi, Japan

[73] Assignee: Japan Synthetic Rubber Co., Ltd., Tokyo, Japan

[21] Appl. No.: 197,679

[22] Filed: Oct. 16, 1980

[30] Foreign Application Priority Data

Oct. 22, 1979 [JP] Japan .................................. 54/135303

[51] Int. Cl.³ .................... B32B 5/00; B32B 25/00; B32B 25/02
[52] U.S. Cl. .................................. 428/260; 428/262; 428/265; 428/267; 428/272; 428/280; 428/290; 428/521; 428/523; 428/252
[58] Field of Search ............... 428/260, 262, 265, 267, 428/269, 272, 280, 289, 290, 516, 517, 519, 521, 523

[56] References Cited

U.S. PATENT DOCUMENTS 3,528,473  9/1970  Torti et al. ........................ 152/330
4,211,692  7/1980  Barkis et al. ...................... 428/516

Primary Examiner—William J. Van Balen
Attorney, Agent, or Firm—Oblon, Fisher, Spivak, McClelland & Maier

[57] ABSTRACT

By blending 5–40 parts by weight of a polyisoprene having an intrinsic viscosity [n] of 0.2–1.5 dl/g as measured in toluene at 30° C. and a total 1,2- and 3,4-configuration content of 30% or less in its micro-structure into 100 parts by weight of an ethylene-propylene rubber, the adhesive property of the ethylene-propylene rubber to fibers can be improved while maintaining the heat resistance, weather resistance, ozone resistance, low temperature properties, electrical insulating property and chemical resistance which are all characteristic of ethylene-propylene rubber.

10 Claims, No Drawings

FIBROUS SUBSTRATE VULCANIZATION-ADHERED TO ETHYLENE-PROPYLENE RUBBER COMPOSITION

This invention relates to an article obtained by subjecting a fibrous substrate and an ethylene-propylene rubber composition to vulcanization-adhering.

Ethylene-propylene rubber (hereinafter simply referred to as EP rubber) is a polymer excellent in heat resistance, weather resistance, ozone resistance, low temperature characteristics, electrical insulating property, chemical resistance to polar solvents, etc. and is used in many fields including automobile parts, construction parts, electrical parts, hoses, industrial materials and the like. However, EP rubber is poor in adhesion to fibrous substrates because it has neither chemically reactive group nor polar group in its molecule. Accordingly, when a product produced by the vulcanizing adhesion of EP rubber layer and fibrous substrate is used in the above-mentioned fields, the usage of the product is limited and the EP rubber is often used as a blend with another rubber having a good adhesive property. For example, in the hitherto employed techniques, an appropriate quantity of diene rubber, halogenated butyl rubber or the like is blended into EP rubber to improve the adhesive property of EP rubber while keeping the characteristic properties of EP rubber.

In this case, however, no sufficient adhesive effect can be obtained if the quantity of blended rubber is small. On the other hand, if a large quantity of diene rubber is blended, the heat resistance, weather resistance and other properties of EP rubber are greatly injured and its mechanical characteristics are deteriorated even though the vulcanizing adhesive property may be improved to a considerable extent.

The object of this invention is to improve the adhesive property of EP rubber to fibrous substrates without lowering the desirable characteristic properties and mechanical strength of EP rubber in the form of vulcanizate.

According to this invention, there is provided an article obtained by subjecting to vulcanization-adhering a fibrous substrate and an ethylene-propylene rubber composition which comprises 100 parts by weight of an ethylene-propylene rubber and 5–40 parts by weight of a polyisoprene having an intrinsic viscosity $[\eta]$ of 0.2–1.5 dl/g as measured in toluene at 30° C. and a total of 1,2- and 3,4-configuration content of 30% or less in its micro-structure, and a vulcanizing agent.

The EP rubbers usable in this invention include copolymers of ethylene and propylene and ethylene-propylene-non-conjugated diene terpolymers containing at least one non-conjugated diene such as ethylidene-norbornene, dicyclopentadiene, 1,4-hexadiene, methylenenorbornene, 4,7,8,9-tetrahydroindene or the like. As said EP rubber, generally commercial ones may be used.

The polyisoprenes usable in this invention are liquid polyisoprene having an intrinsic viscosity $[\eta]$ of 0.2–1.5 dl/g as measured in toluene at 30° C. and a total 1,2- and 3,4-configuration content of 30% or less as measured according to the method mentioned in J. Polym. Sci. Part A-29, 43–57 (1971). If $[\eta]$ is less than 0.2, the cross-linking reaction between the liquid polyisoprene and the EP rubber cannot take place sufficiently and, as a result, there is obtained no adhesive effect after vulcanization. On the other hand, if $[\eta]$ exceeds 1.5, the processability of unvulcanized rubber and the general properties of vulcanized rubber become worse remarkably. $[\eta]$ is preferably in the range of 0.2–1.2, more preferably in the range of 0.25–1.0.

The vulcanizing adhesive property of EP rubber to fibrous substrate varies depending on the total quantity of 1,2- and 3,4-configurations in the microstructure. If it exceeds 30%, the adhesive strength drops, which is undesirable. It is preferably 15% or less, and its lower limit is not critical.

Said polyisoprene can be prepared by various processes. For example, it can be obtained by polymerization processes such as radical polymerizaton, anionic polymerization, cationic polymerization, coordinated anionic polymerization and the like or by depolymerization processes of natural rubber by means of thermal degradation or ozone degradation. However, it is preferable to use polyisoprene prepared by an emulsion polymerization process in order to obtain a composition excellent in adhesive strength.

The amount of polyisoprene to be blended is 5–40 parts by weight, preferably 10–30 parts by weight. If it is less than 5 parts by weight no improving effect on the adhesive property can be obtained. On the other hand, if it exceeds 40 parts by weight the mechanical strengths (tensile modulus, tensile strength, tear strength) of the vulcanized rubber and the resistance to thermal aging which is a characteristic advantage of EP rubber are injured.

The vulcanizing agent used in this invention includes sulfur, organic peroxides and the like.

The amount of the vulcanizing agent used is not critical, though the vulcanizing agent is suitably used in an amount of 0.1 to 4 parts by weight in the case of sulfur or 0.5 to 6 parts by weight in the case of organic peroxide, per 100 parts by weight of the EP rubber.

As the fibrous substrate, rayon, vinylon, polyamide, polyester and the like can be used. They can be used in various forms such as fiber, cord, woven fabric, non-woven fabric, sheet, film, felt and the like.

The EP rubber composition used in this invention may contain well known additives such as carbon black, filler, softening agent, zinc oxide, stearic acid, antioxidant, vulcanization accelerator and the like, if necessary.

The blending of EP rubber, liquid polyisoprene, vulcanizing agent and other additives can be carried out by a usual means such as Banbury mixer, roll mill or the like. The mixture thus obtained can be formed into any shape by a usual means such as an extruder or a calender roll.

For obtaining the article of this invention, an EP rubber, liquid polyisoprene, a vulcanizing agent and the above-mentioned additives such as carbon black are blended together in a kneader such as Banbury mixer, roll mill or the like to prepare an unvulcanized compound and then the fibrous substrate is laminated to said compound or embedded therein, after which it is vulcanized and formed by means of press vulcanizing machine, hot air vulcanizing machine, steam vulcanizing machine or the like.

Thus, the article of this invention includes tires, belts, hoses, rubberized sheets and the like.

This invention will be illustrated below more concretely with reference to Examples, which are not by way of limitation, but by way of illustration.

[CRITERIA FOR THE MEASUREMENTS IN THE EXAMPLES]

Fiber adhesion test: JIS K 6301 (7)

(1) As the cloth layer in the fiber adhesion test, there was used polyamide or polyester fiber treated with RFL (resorcinol, formaldehyde and latex) solution.

(2) Method and conditions for the preparation of test piece for the fiber adhesion test:

The cloth is put between a pair of unvulcanized rubber layers. A sheet of cloth layer and the rubber layers are bonded by moving a manual pressing roller from one end to the other end so as to prevent the trapping of air. At said other end which will be gripped at the time of test, adhesion is avoided by putting a cellophane sheet beforehand between the cloth and rubber layers. Vulcanization is carried out at 150° C. for 30 minutes with a vulcanizing press. After vulcanization, strips having a width of 25 mm are punched out therefrom by means of a punching machine, with which strips the test is carried out.

Mooney viscosity test (compound): JIS K 6300

Tensile modulus, tensile strength, elongation, hardness and tear strength: JIS K 6301

Compression Set: JIS K 6301, 100° C.×70 hours

[EXPLANATION OF MATERIALS USED IN THE EXAMPLES]

| EP rubber-I: | ethylene-propylene-non-conjugated diene terpolymer (JSR EP 33, manufactured by Japan EP Rubber) |
|---|---|
| $ML_{1+4}$ (100° C.): | 45.0 |
| Non-conjugated diene: | ethylidene-norbornene |
| Content of non-conjugated diene ($I_2NO$): | 26 |
| Content of propylene: | 43% by weight |

| EP rubber-II: | ethylene-propylene-non-conjugated diene terpolymer (JSR EP 57c, manufactured by Japan EP Rubber) |
|---|---|
| $ML_{1+4}$ (100° C.): | 90.0 |
| Non-conjugated diene: | ethylidene-norbornene |
| Content of non-conjugated diene ($I_2NO$): | 15 |
| Content of propylene: | 28% by weight |

Liquid polyisoprene-I: emulsion polymerization (emulsifier: rosin soap)
Temperature of polymerization: 10° C.
$[\eta]_{toluene}^{30°\,C.} = 0.38$ dl/g
Micro-structure: 1,4-configuration 89.8%, 1,2-configuration 6.0%, 3,4-configuration 4.2%.

Liquid polyisoprene-II: emulsion polymerization (emulsifier: rosin soap)
Temperature of polymerization: 10° C.
$[\eta]_{toluene}^{30°\,C.} = 0.64$ dl/g
Micro-structure: 1,4-configuration 89.8%, 1,2-configuration 5.9%, 3,4-configuration 4.3%.

Liquid polyisoprene-III: emulsion polymerization (emulsifier: rosin soap)
Temperature of polymerization: 10° C.
$[\eta]_{toluene}^{30°\,C.} = 1.16$ dl/g
Micro-structure: 1,4-configuration 89.7%, 1,2-configuration 6.0%, 3,4-configuration 4.3%.

Liquid polyisoprene-IV: solution polymerization (catalyst: n-butyllithium-diglyme diethyleneglycol dimethyl ether, solvent: toluene)
Temperature of polymerization: 50° C.
$[\eta]_{toluene}^{30°\,C.} = 0.43$ dl/g
Micro-structure: 1,4-configuration 91.8%, 3,4-configuration 8.2%, 1,2-configuration 0.0%.

Liquid polyisoprene-V: solution polymerization (catalyst: n-butyl lithium-diglyme, solvent: toluene)
Temperature of polymerization: 50° C.
$[\eta]_{toluene}^{30°\,C.} = 0.42$ dl/g
Micro-structure: 1,4-configuration 72.7%, 3,4-configuration 25.5%, 1,2-configuration 1.8%.

Liquid polyisoprene-VI: solution polymerization (catalyst: n-butyllithium-diglyme, solvent: toluene)
Temperature of polymerization: 50° C.
$[\eta]_{toluene}^{30°\,C.} = 0.39$ dl/g
Micro-structure: 1,4-configuration 60.5%, 3,4-configuration 36.9%, 1,2-configuration 2.6%.

Liquid polyisoprene-VII: solution polymerization (catalyst: n-butyllithium-diglyme, solvent: toluene)
Temperature of polymerization: 30° C.
$[\eta]_{toluene}^{30°\,C.} = 0.51$ dl/g
Micro-structure: 1,4-configuration 23.8%, 3,4-configuration 63.9%, 1,2-configuration 12.3%.

Liquid polybutadiene: solution polymerization (catalyst: triethylaluminum-nickel naphthenate-boron trifluoride etherate, solvent: toluene)
Temperature of polymerization: 60° C.
$[\eta]_{toluene}^{30°\,C.} = 0.7$ dl/g
Micro-structure: cis 89.0%, trans 8.9%, 1,2-configuration 2.1%.

Liquid styrene-butadiene copolymer: emulsion polymerization (emulsifier: rosin soap)
Temperature of polymerization: 5° C.
$[\eta]_{toluene}^{30°\,C.} = 0.72$ dl/g HAF Carbon: Diablack H (a trade name of Mitsubishi Chemical Industries, Ltd.)

Accelerator CBS: N-cyclohexyl-2-benzothiazyl-sulfenamide (manufactured by Ouchi Shinko Kagaku Kogyo K. K.)

EXAMPLES 1–10 AND COMPARATIVE EXAMPLES 1–8

A series of compositions shown in Table 1 were blended in a roll mill to obtain the intended rubber compositions.

By using these rubber compositions, a fiber adhesion test was carried out according to the aforementioned testing method to measure the adhesive strengths. The results are shown in Table 2.

Also, these rubber compositions were vulcanized by pressing at 150° C. for 30 minutes, and then the physical properties of vulcanizates were measured. The results are shown in Table 2.

As are apparent from Table 2, the compositions of the Examples of this invention are markedly improved in adhesiveness to fibrous substrate and, at the same time, improved in tear strength of vulcanizate, and their characteristic properties such as tensile strength, elongation, compression set, etc. are retained.

On the other hand, the composition of comparative Example 3 containing a smaller quantity of liquid polyisoprene is unsatisfactory in adhesive property. In the composition of Comparative Example 4 in which the content of liquid polyisoprene exceeds the range specified in this invention, the properties of vulcanizate, particularly tensile modulus and tensile strength, are markedly lower and the result of thermal aging test is bad.

In Comparative Examples 5 and 6 wherein the liquid polyisoprene used has a total 1,2- and 3,4-configuration content exceeding 30% and in Comparative Examples 7 and 8 wherein a liquid polybutadiene or a liquid styrene-butadiene copolymer is used, such an excellent effect on improving the adhesive property as in this invention is not obtained.

TABLE 1

| Constituent (parts by weight) | Example No. | | | | | | | | | | Comparative Example No. | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 |
| EP rubber-I | 100 | 100 | 100 | 100 | 100 | 100 | 100 | 100 | 100 | | 120 | 100 | 100 | 100 | 100 | 100 | 100 | 100 |
| EP rubber-II | | | | | | | | | | 100 | | | | | | | | |
| Liquid polyisoprene I | 20 | | | | | | | | | | | | | | | | | |
| Liquid polyisoprene II | | 7.5 | 10 | 20 | 30 | 40 | | | | 20 | | | 3 | 50 | | | | |
| Liquid polyisoprene III | | | | | | | 20 | | | | | | | | | | | |
| Liquid polyisoprene IV | | | | | | | | 20 | | | | | | | | | | |
| Liquid polyisoprene V | | | | | | | | | 20 | | | | | | | | | |
| Liquid polyisoprene VI | | | | | | | | | | | | | | | 20 | | | |
| Liquid polyisoprene VII | | | | | | | | | | | | | | | | 20 | | |
| Aromatic oil | | | | | | | | | | | | | | 20 | | | | |
| Liquid polybutadiene | | | | | | | | | | | | | | | | | 20 | |
| Liquid styrene-butadiene copolymer | | | | | | | | | | | | | | | | | | 20 |
| Zinc oxide | 5 | 5 | 5 | 5 | 5 | 5 | 5 | 5 | 5 | 5 | 5 | 5 | 5 | 5 | 5 | 5 | 5 | 5 |
| Stearic acid | 2 | 2 | 2 | 2 | 2 | 2 | 2 | 2 | 2 | 2 | 2 | 2 | 2 | 2 | 2 | 2 | 2 | 2 |
| HAF Carbon | 50 | 50 | 50 | 50 | 50 | 50 | 50 | 50 | 50 | 50 | 50 | 50 | 50 | 50 | 50 | 50 | 50 | 50 |
| Accelerator CBS | 2 | 2 | 2 | 2 | 2 | 2 | 2 | 2 | 2 | 2 | 2 | 2 | 2 | 2 | 2 | 2 | 2 | 2 |
| Sulfur | 2 | 2 | 2 | 2 | 2 | 2 | 2 | 2 | 2 | 2 | 2 | 2 | 2 | 2 | 2 | 2 | 2 | 2 |

TABLE 2

| Item of test | Example No. | | | | | | | | | | Comparative Example No. | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 |
| Fiber adhesion test (kgf/cm) | | | | | | | | | | | | | | | | | | |
| Polyamide | 3.40 | 1.98 | 2.33 | 3.31 | 10.31 | 7.74 | 2.34 | 2.26 | 1.62 | 2.24 | 0.27 | 0.68 | 0.83 | 6.88 | 1.06 | 0.66 | 1.16 | 0.72 |
| Polyester | — | — | — | — | 4.81 | — | — | — | — | — | 0.54 | — | — | — | — | 0.69 | — | — |
| Compound $ML_{1+4}$ (100° C.) | 38.5 | 53.0 | 50.0 | 42.5 | 32.0 | 28.0 | 48.0 | 35.5 | 36.0 | 74.5 | 51.5 | 34.5 | 57.0 | 23.5 | 36.5 | 38.5 | 44.5 | 42.0 |
| Properties of vulcanizate | | | | | | | | | | | | | | | | | | |
| 100% Tensile modulus (kgf/cm$^2$) | 30 | 41 | 37 | 30 | 25 | 22 | 34 | 30 | 31 | 32 | 34 | 29 | 45 | 18 | 32 | 38 | 32 | 34 |
| 300% Tensile modulus (kgf/cm$^2$) | 93 | 151 | 132 | 95 | 78 | 60 | 107 | 102 | 118 | 96 | 137 | 101 | 172 | 46 | 129 | 126 | 93 | 106 |
| Tensile strength (kgf/cm$^2$) | 189 | 215 | 202 | 193 | 175 | 131 | 203 | 207 | 210 | 240 | 204 | 165 | 224 | 94 | 225 | 222 | 187 | 196 |
| Elongation (%) | 540 | 410 | 420 | 520 | 550 | 550 | 510 | 510 | 470 | 580 | 400 | 430 | 390 | 550 | 450 | 450 | 540 | 490 |
| Hardness (JIS A) | 72 | 75 | 75 | 71 | 68 | 66 | 72 | 72 | 72 | 75 | 72 | 70 | 76 | 64 | 72 | 79 | 72 | 70 |
| Tear strength (kgf/cm) | 44 | 39 | 42 | 42 | 37 | 32 | 42 | 35 | 35 | 45 | 31 | 29 | 36 | 27 | 35 | 40 | 41 | 32 |
| Compression set (%) | 80 | 75 | 75 | 77 | 81 | 83 | 74 | 75 | 76 | 69 | 78 | 80 | 75 | 85 | 76 | 75 | 74 | 80 |
| Thermal aging test | | | | | | | | | | | | | | | | | | |
| Change of tensile strength (%) | +5 | −1 | +8 | +1 | −3 | −11 | +3 | −4 | −3 | −5 | −8 | −11 | −8 | −21 | −3 | −7 | −8 | −6 |
| Change of elongation (%) | −26 | −37 | −32 | −28 | −30 | −41 | −27 | −39 | −39 | −18 | −47 | −52 | −43 | −51 | −40 | −46 | −50 | −45 |

What is claimed is:

1. An article obtained by subjecting to vulcanizing-adhesion a fibrous substrate and an ethylene-propylene rubber composition comprising 100 parts by weight of an ethylene-propylene rubber, 5–40 parts by weight of polyisoprene having an intrinsic viscosity $[\eta]$ of 0.2–1.5 dl/g as measured in toluene at 30° C. and a total 1,2- and 3,4-configuration content of 30% or less, and a vulcanizing agent.

2. An article according to claim 1, wherein said ethylene-propylene rubber is an ethylene-propylene-nonconjugated diene terpolymer.

3. An article according to claim 2, wherein the non-conjugated diene in the terpolymer is at least one member selected from the group consisting of ethylidene-norbornene, dicyclopentadiene, 1,4-hexadiene, methylene-norbornene and 4,7,8,9-tetrahydroindene.

4. An article according to claim 2, wherein the nonconjugated diene in the copolymer is ethylidene-norbornene.

5. An article according to claim 1, wherein said polyisoprene has an intrinsic viscosity [$\eta$] of 0.25–1.0 dl/g.

6. An article according to claim 1 or 5, wherein said polyisoprene has a total 1,2- and 3,4-configuration content of 15% or less.

7. An article according to claim 1 or 5, wherein the polyisoprene is prepared by an emulsion polymerization.

8. An article according to claim 1 or 5, wherein the amount of polyisoprene is 10–30 parts by weight.

9. An article according to claim 1 which additionally contains carbon black, filler, softening agent, zinc oxide, stearic acid, antioxidant, and vulcanization accelerator.

10. An article according to claim 1 or 5, wherein the fibrous substrate is of polyamide, polyester, vinylon or rayon.

* * * * *